United States Patent [19]
Tachibana

[11] Patent Number: 5,877,869
[45] Date of Patent: Mar. 2, 1999

[54] FACSIMILE APPARATUS OPERABLE AS A PRINTER

[75] Inventor: Shunichi Tachibana, Urayasu, Japan

[73] Assignee: Canon Kabushiki Kaisha, Tokyo, Japan

[21] Appl. No.: 370,832

[22] Filed: Jan. 10, 1995

Related U.S. Application Data

[63] Continuation of Ser. No. 13,736, Feb. 4, 1993, abandoned.

[30] Foreign Application Priority Data

Feb. 5, 1992 [JP] Japan ................................. 4-054282

[51] Int. Cl.$^6$ ....................................................... H04N 1/00
[52] U.S. Cl. ........................... 358/437; 358/400; 358/442
[58] Field of Search .................................. 358/400, 402, 358/468, 444, 440, 401, 442, 407, 437; 379/100.1, 93.09, 93.14, 100.15, 100.06; 382/155, 157; 395/109, 112, 113, 114

[56] References Cited

U.S. PATENT DOCUMENTS

| | | | |
|---|---|---|---|
| 4,751,006 | 6/1988 | Becker | 210/774 |
| 4,833,705 | 5/1989 | Kobayashi | 379/93 |
| 4,905,098 | 2/1990 | Sakata | 358/468 |
| 4,920,427 | 4/1990 | Hirata | 358/444 |
| 4,937,762 | 6/1990 | Todome | 358/468 |
| 4,947,345 | 8/1990 | Paradise et al. | 364/519 |
| 5,017,942 | 5/1991 | Asakura et al. | 346/76 |
| 5,019,916 | 5/1991 | Ogura | 358/401 |
| 5,021,892 | 6/1991 | Kita et al. | 358/468 |
| 5,095,372 | 3/1992 | Silverberg | 358/401 |
| 5,200,830 | 4/1993 | Imaizumi et al. | 358/442 |
| 5,245,368 | 9/1993 | Farrell et al. | 358/401 |
| 5,280,585 | 1/1994 | Kochis et al. | 395/275 |
| 5,383,030 | 1/1995 | Seo | 358/468 |

*Primary Examiner*—Edward L. Coles
*Assistant Examiner*—Madeleine Au Nguyen
*Attorney, Agent, or Firm*—Fitzpatrick Cella Harper & Scinto

[57] ABSTRACT

A facsimile apparatus having an external interface and having a printer mode for printing out data received through the external interface and a facsimile mode for communicating image data through a line, comprises a detection unit for detecting occurrence of condition in which to operate as facsimie; and a unit normally set in the printer mode, for switching from the printer mode to the facsimile mode in accordance with a detection by the detection unit.

20 Claims, 7 Drawing Sheets

FACSIMILE APPARATUS OPERABLE AS A PRINTER

This application is a continuation division, of application Ser. No. 08/013,736 filed Feb. 4, 1993 now abandoned.

BACKGROUND OF THE INVENTION

1. Field of the Invention

The present invention relates to a facsimile apparatus which has an external interface and is operable as a printer.

2. Related Background Art

In a conventional printer built-in facsimile apparatus, it is normally operated in a facsimile mode to function as a facsimile apparatus, and when it is to be operated as a printer, a user switches to a printer mode, and after the operation as the printer, the user again switches back to the facsimile mode.

In the prior art apparatus, when it is desired to print out a document from a computer, it is necessary for the operator to switch the mode of the facsimile apparatus each time. This is very troublesome particularly when the computer is located at a distant place from the facsimile apparatus.

Further, if the user forget to switch back to the facsimile mode after he/she has used in the printer mode, the facsimile apparatus fails to receive a calling signal (CI) from a line.

SUMMARY OF THE INVENTION

It is an object of the present invention to improve a facsimile apparatus to avoid the above problems.

It is another object of the present invention to provide a facsimile apparatus which assures switching between the facsimile mode and the printer mode without troublesome operation.

In order to achieve the above objects, in accordance with the present invention, a means is provided which normally stands by as a printer (stands by in the printer mode), and when the occurrence of an operation factor as the facsimile apparatus is detected by a detection means, switches from the printer mode to the facsimile mode.

In accordance with a further feature of the present invention, the operability of the apparatus is improved by efficiently conducting the switching between the facsimile mode and the printer mode.

Other objects, features and advantages of the present invention will be apparent from the following detailed description of the preferred embodiments and the accompanying drawings.

DETAILED DESCRIPTION OF THE PREFERRED EMBODIMENTS

The preferred embodiments of the present invention are now described in detail with reference to the drawings.

Figure 1:
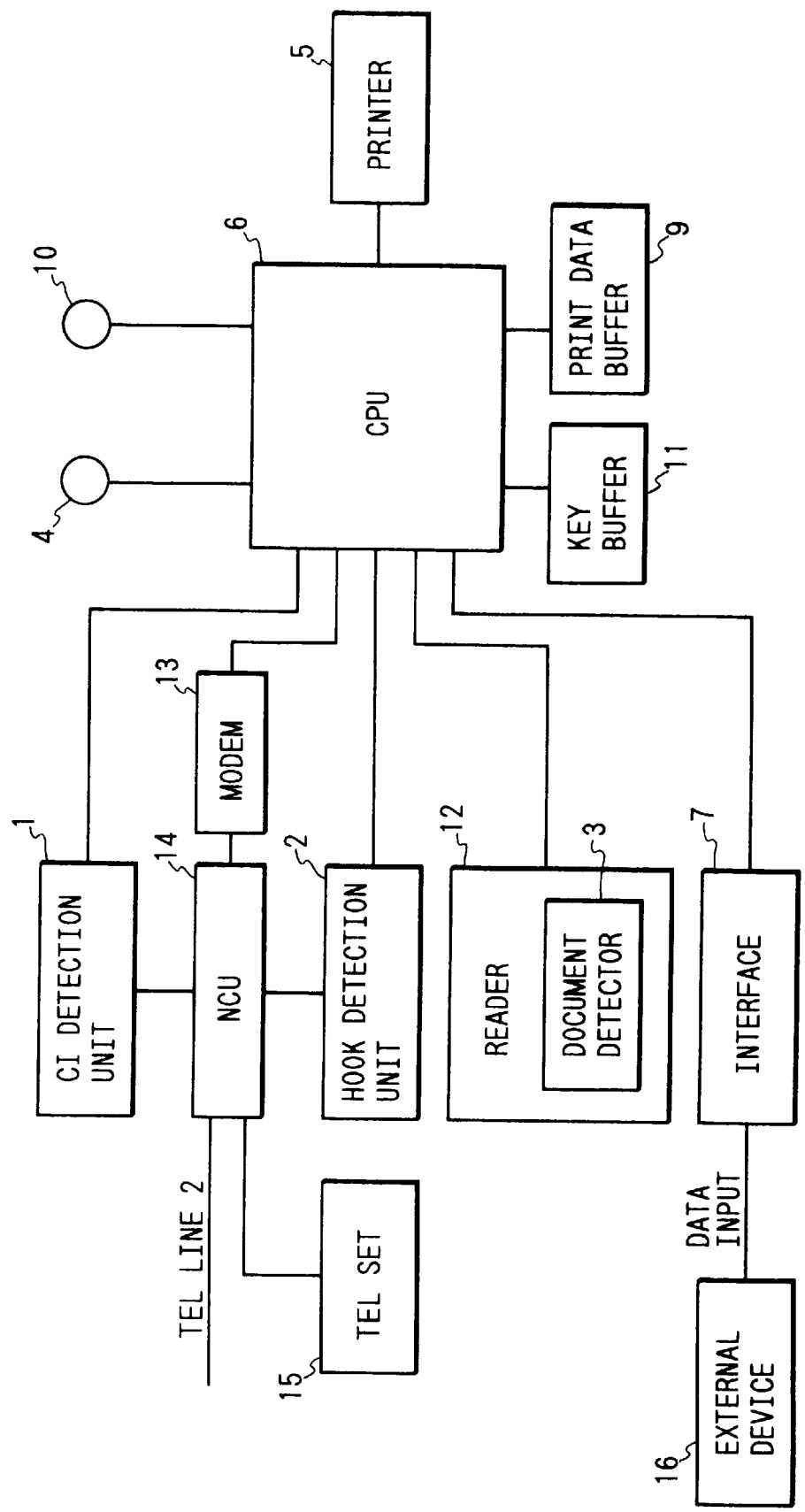
FIG. 1 shows a block diagram of a configuration of a first embodiment of the present invention.

FIG. 1 shows block diagram of a configuration of the facsimile apparatus in accordance with a first embodiment of the present invention.

The facsimile apparatus comprises a CI detection unit 1 for detecting a calling signal (CI call) from an external line, a hook detection unit 2 for detecting the status of a hook switch of an accessory telephone set, a document detection unit 3 for detecting the presence or absence of a document at a document read station of a document read unit 12, a start key 4 by which a user instructs the transmission, the reception or the copying, a printer 5 for printing an image on a record sheet, a CPU 6 for controlling the printer and the facsimile apparatus, an external interface for a printer mode of the facsimile apparatus, a print data buffer 9 for temporarily storing print data received from the external interface 7, a switching key 10 for switching between an auto-receive mode and a manual receive mode, and a key buffer 11 for temporarily storing the content of the depressed key. Numeral 13 denotes a modem and numeral 14 denotes a NCU for switching the line between a telephone set 15 and the modem 13.

The CPU 6 continuously monitors the start key 4 and the receive mode switching key 10 by periodic interruption, and when one of the keys is depressed, it saves the information in the key buffer 11. The CPU 6 also continuously monitors the external interface 7 by the periodic interruption, and when print data is received, it saves the information in the print data buffer 9.

The CPU 6 operates in the printer mode during the stand-by. During the printer mode, the CPU 6 controls the printer. The CPU 6 receives a print signal from a host computer (external device) 16 into the print data buffer 9 through the external interface 7, reads the received data from the print data buffer 9, converts it to an image, and sends it to the printer 5 for printing it out. The printer process is described in U.S. Pat. No. 4,715,006 (issued on Dec. 22, 1987).

On the other hand, during the facsimile mode, the CPU 6 controls the facsimile apparatus. The facsimile process is one in accordance with the CCITT Recommendation.

Figure 2:
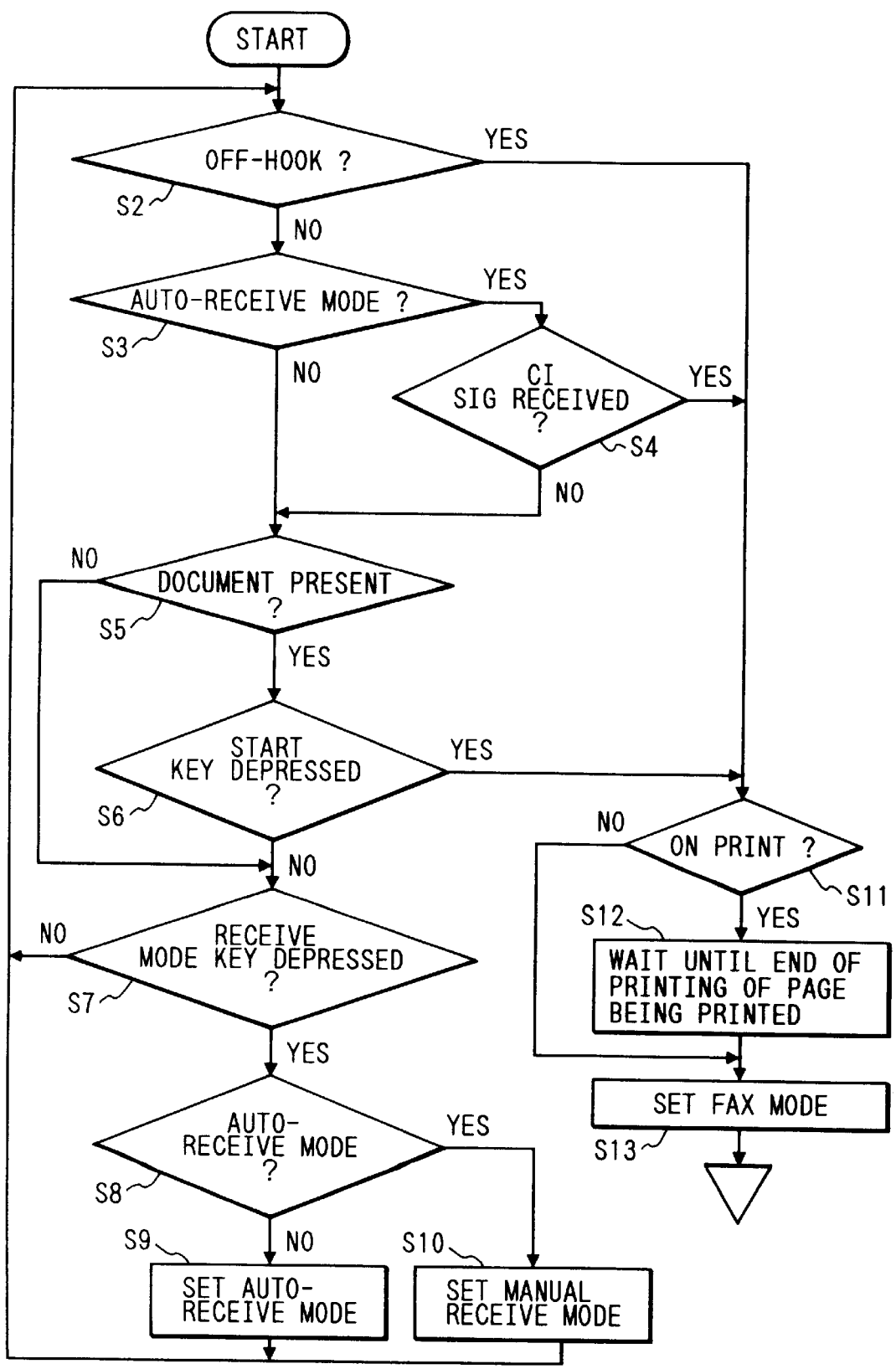
FIG. 2 shows flow chart of a process in a stand-by mode in the first embodiment.

FIG. 2 shows a flow chart of a process in a stand-by mode in the present embodiment.

In S2, when the CPU 6 determines that the telephone circuit 2 is in an off-hook status, the process proceeds to S11 to switch the mode to the facsimile mode, because there is a high probability of the facsimile transmission or the manual reception in the off-hook status so that the apparatus is ready to immediately operate as the facsimile when the start key 4 is depressed. Steps S11 to S13 will be described later.

In S2, if the telephone circuit 2 is not in the off-hook status, whether it is in the auto-receive mode or not is determined (S3). If it is in the auto-receive mode, the CPU 6 refers the CI detection unit 1 (S4), and if it is determined that the CI is being received, the process proceeds to S11 to switch the mode to the facsimile mode.

In S4, if the CI is not being received, the CPU 6 refers the document detection unit 3 (S5), and if the presence of the document is detected, the CPU 6 refers the key buffer 11 (S6). If the depression of the start key 4 is detected, the process proceeds to S11 to switch the mode to the facsimile mode in order to switch to the copy operation.

If the start key 4 has not been depressed in S6, the CPU 6 refers the key buffer 11, and if the depression of the receive mode switching key 10 is detected (S7), it switches the receive mode. Namely, if the current mode is the auto-receive mode (S8), the manual receive mode is set in S10 and the process returns to S2. If the current mode is not the auto-receive mode in S8, the auto-receive mode is set in S9 and the process returns to S2.

S11 to S13 are steps to switch from the printer mode to the facsimile mode. If the printer 5 is in process of printing in S11, the process waits until the completion of printing of a current page and then process proceeds to S13.

While the printing is interrupted, the reception of the print data from the external device is continued so long as the print data buffer has a vacant area so that the external device need not wait.

If the printer is not in process of printing in S11, the mode is switched to the facsimile mode in S13, the stand-by step is terminated, and the process proceeds to the facsimile process. At the end of the facsimile process, the process returns to the stand-by process. If print data remains in the print data buffer 9, the printing thereof is started.

Figure 3:
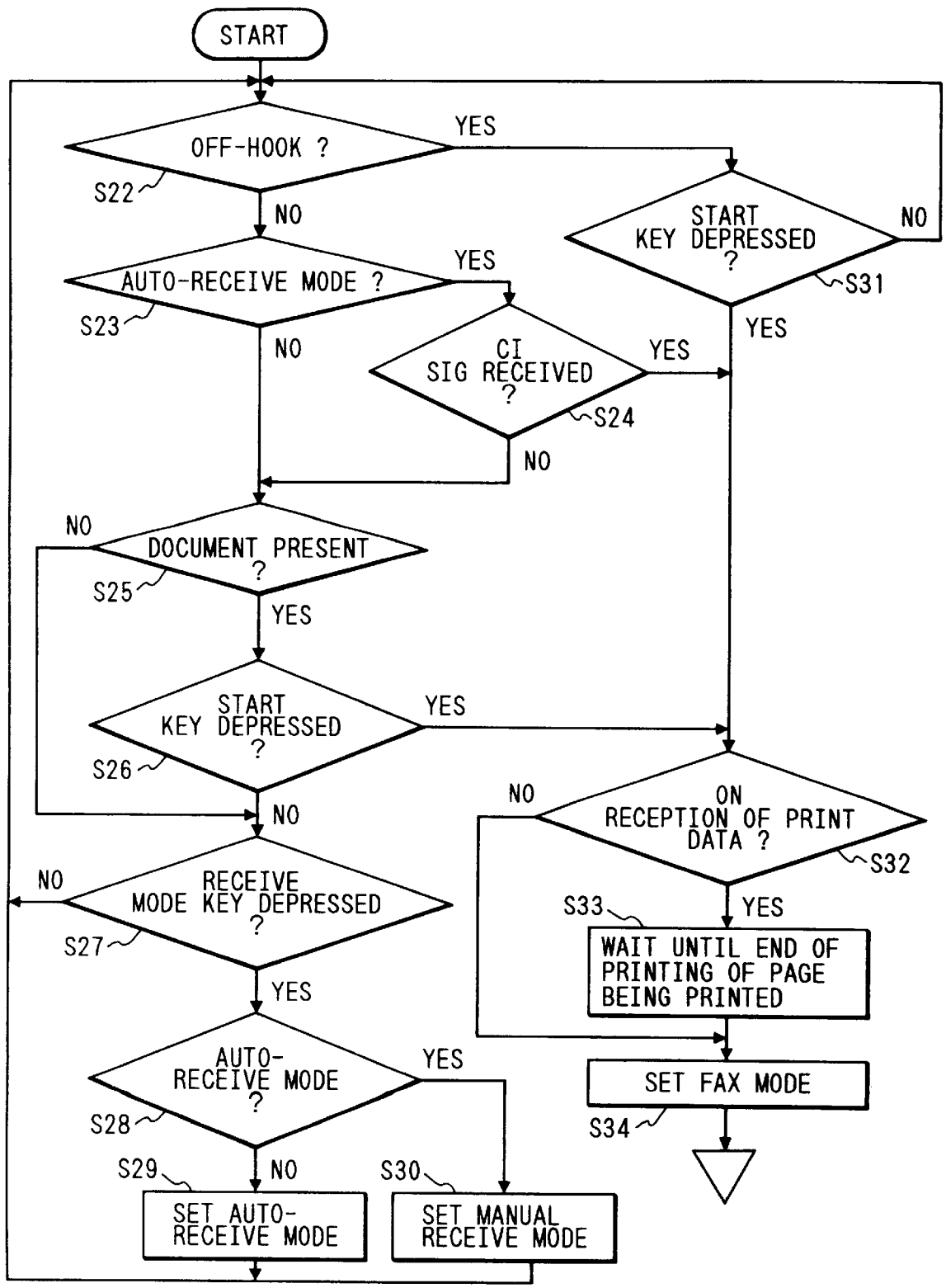
FIG. 3 shows a flow chart of a process in a stand-by mode in a second embodiment of the present invention.

FIG. 3 shows a flow chart of a process in the stand-by mode in a second embodiment of the present invention.

In S22, the CPU 6 refers the hook detection unit 2, and if it detects the off-hook status, the CPU 6 refers the key buffer 11 in S31, and if it determines that the start key 4 has not been depressed, the process proceed to S32 to switch the mode to the facsimile mode. This process is attained if the print speed of the printer 5 is sufficiently high.

Thus, it is no longer necessary to stop the print operation each time the telephone is to be used. Steps S32 to S34 will be described below.

If the start key 4 has not been depressed in S31, the process returns to S22. If the off-hook status is not detected in S22, the receive mode is checked in S23, and if it is the auto-receive mode, the process proceeds to S24.

In S24, the CPU 6 refers the CI detection unit 1, and if it is determined that CI is being received, the process proceeds to S32 to switch the mode to the facsimile mode.

If CI is not being received in S24, the CPU 6 refers the document detection unit 3 (S25), and if the presence of document is detected, the CPU 6 refers the key buffer 11 in S26, and if the depression of the start key 4 is detected, the process proceeds to S32 to switch the mode to the facsimile mode in order to switch to the copy operation.

If the start key 4 has not been depressed in S26, the CPU 6 refers the key buffer 11 in S27, and if the depression of the receive mode switching key 10 is detected, the receive mode is switched. Namely, the current receive mode is determined (S28), and if it is the auto-receive mode, the manual receive mode is set in S30 and the process returns to S22. If the current receive mode is not the auto-receive mode in S28, the auto-receive mode is set in S29 and the process returns to S22.

Steps S32 to S34 are ones for switching from the printer mode to the facsimile mode. In S32, if the print data is being received, the process waits until the completion of the reception of the current page in S33, the mode is switched to the facsimile mode in S34, the stand-by process is terminated, and the process proceeds to the facsimile process.

The busy signal of the external interface 7 is rendered active to temporarily stop the reception of the print data from the external device. The print data buffer 9 can be eliminated by this process.

If the print data is not being received in S32, the mode is switched to the facsimile mode in S34, the stand-by process is terminated and the process is switched to the facsimile process.

When the facsimile process is completed, the process immediately returns to the stand-by process. The reception of the print data interrupted in S33 is resumed as required.

Figure 4:
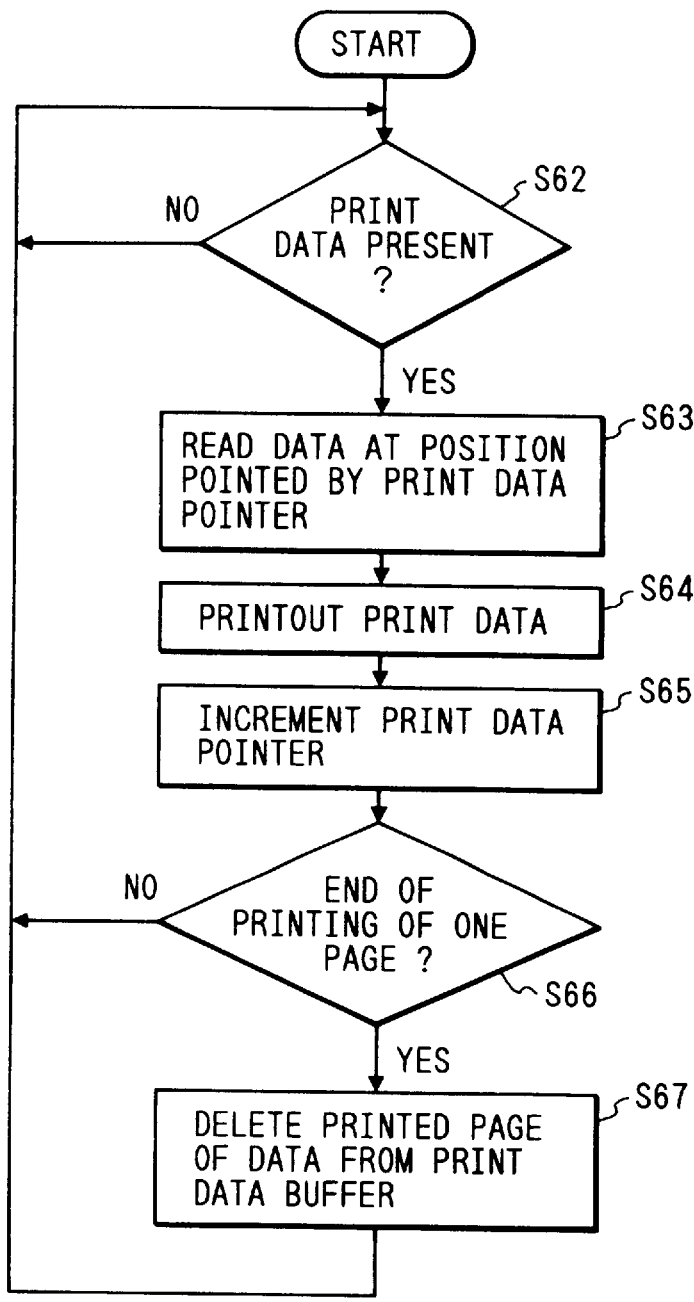
FIG. 4 shows a flow chart of a printer process in a third embodiment of the present invention.
Figure 5:
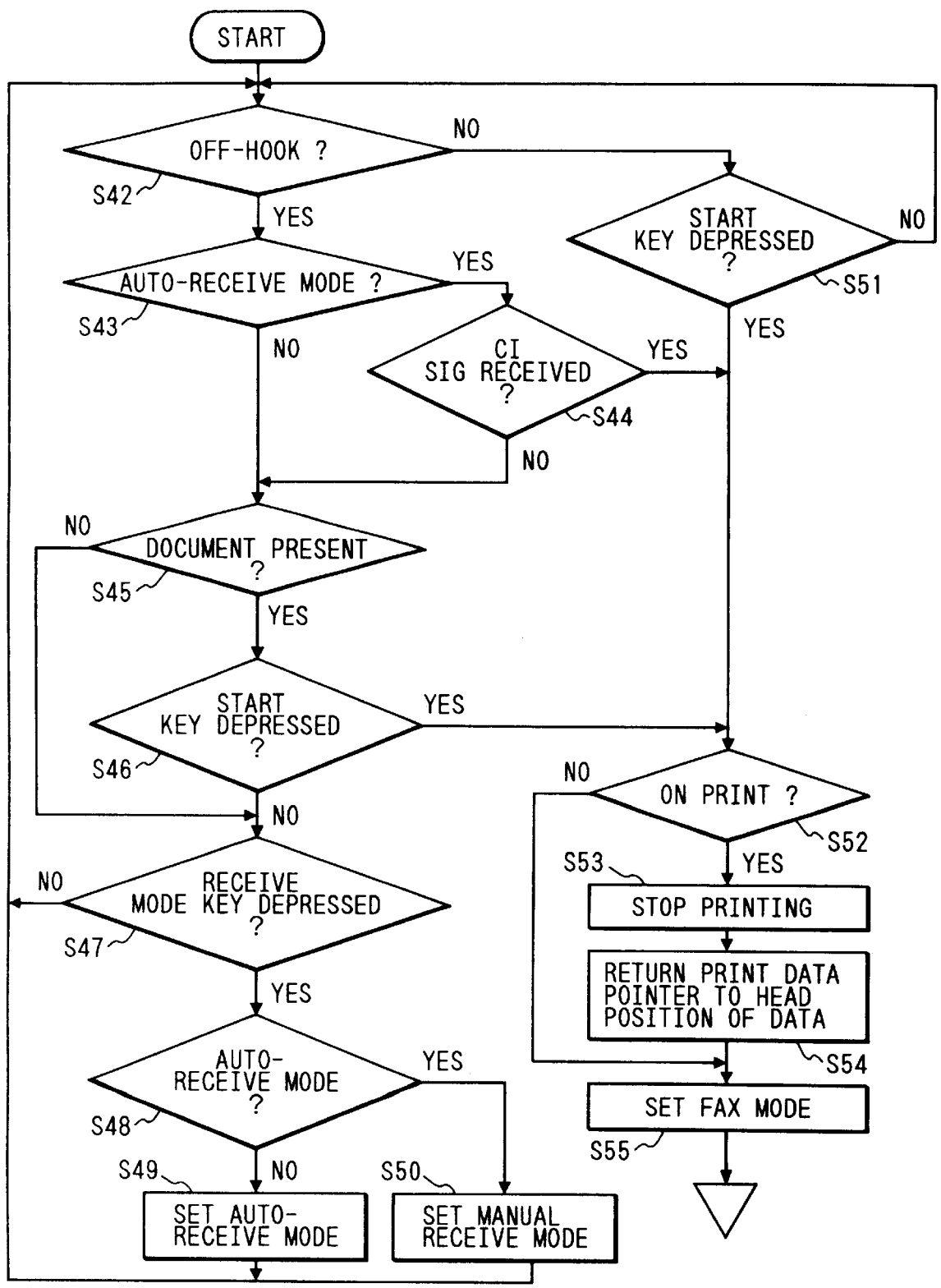
FIG. 5 shows a flow chart of a process in a stand-by mode in the third embodiment.

FIGS. 4 and 5 show flow charts of control operations in a third embodiment of the present invention.

FIG. 4 shows a printer process in the third embodiment.

The CPU 6 refers the print data buffer 9 to check whether there exists print data at a position pointed by a print data pointer (S62). If the print data does not exist, the process returns to S62.

If the print data exists in S62, the data pointed by the print data pointer is read in S63, the read data is printed out (S64), and the print data pointer is advanced to the next data position (S65). Whether one-page printing has been completed or not is determined (S66), and if it is not completed yet, the process returns to S62.

If one-page printing has been completed, the print data of the printed page is deleted from the print data buffer 9 (S67) and the process returns to S62.

FIG. 5 shows the stand-by process in the third embodiment.

The CPU 6 refers the hook detection unit 2 (S42), and if it is the off-hook status, it refers the key buffer 11 (S51). If the depression of the start key 4 is detected, the process proceeds to S52 to switch the mode to the facsimile mode. Steps S52 to S55 will be described later. If the start key has not been depressed in S51, the process returns to S42.

If the off-hook status is not detected in S42, the receive mode is checked in S43. If it is the auto-receive mode, the CPU 6 refers the CI detection unit (S44), and if CI is being received, the process proceeds to S52 to switch the mode to the facsimile mode.

If CI is not being received in S44, the CPU 6 refers the document detection unit 3 (S45), and if the presence of the document is detected, the CPU 6 refers the key buffer 11 in S46. If the depression of the start key 4 is detected, the process proceeds to S52 to switch the mode to the facsimile mode in order to switch the process to the copy operation.

If the start key 6 has not been depressed in S46, the CPU 6 refers the key buffer 11 (S47), and if the depression of the receive mode switching key 10 is detected, the receiving mode is switched. Namely, if the current mode is the auto-receive mode in S48, the manual receive mode is set in S50 and the process returns to S42. If the current mode is not the auto-receive mode in S48, the auto-receive mode is set (S49) and the process returns to S42.

Steps S52 to S55 are ones for switching from the printer mode to the facsimile mode. In S52, if the printer 5 is in process of printing, the printing is interrupted and the sheet is ejected in S53, the print data pointer is returned to the head of the data in S54, and the process proceeds to S55. While the printing is interrupted, the reception of the print data from the external device is continued so long as the print data buffer has a vacant area so that the external device need not wait.

If the printer 5 is not in process of printing in S52, the mode is switched to the facsimile mode in S55, the stand-by process is terminated and the process is switched to the facsimile process.

When the facsimile process is completed, the process immediately returns to the stand-by process. If print data remains in the print data buffer 9, the printing thereof is started.

If the printing is interrupted in the course of one page in S53, the pointer is returned to the head of the page in S54 and the printing is resumed from the head of the interrupted page.

Each of the above-mentioned second and third embodiments has the same configuration as shown in FIG. 1.

Figure 6:
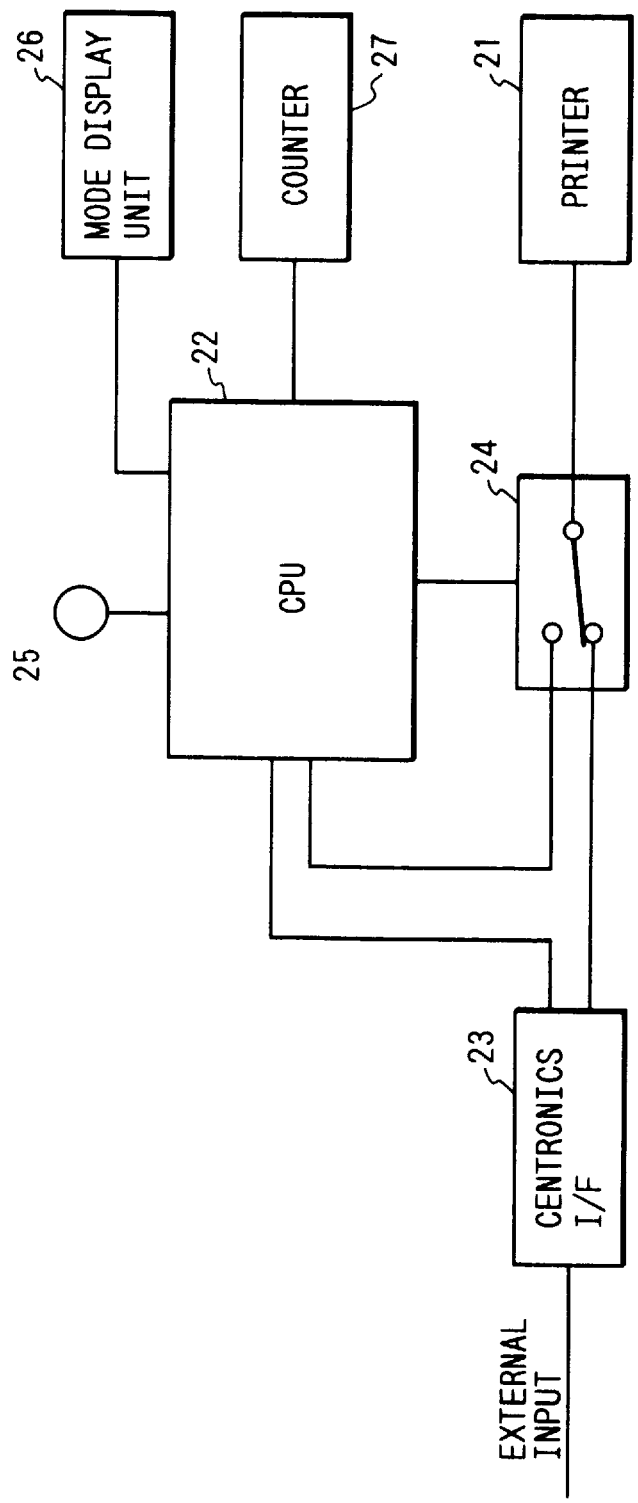
FIG. 6 shows a block diagram of a configuration of a fourth embodiment of the present invention.

FIG. 6 shows a block diagram of a configuration of the facsimile apparatus in accordance with a fourth embodiment of the present invention. In FIG. 6, the CI detection unit 1, the hook detection unit 2, the modem 13, the NCU 14, the telephone set 15, the document detection unit 3 and the read unit 12 are omitted although they are provided in the same manner as that of FIG. 1.

The facsimile apparatus comprises a printer 21 for printing an image on a record sheet, a CPU 22 for controlling the facsimile, an external centronics interface 23 for the printer mode, a printer input selection switch 24 for selecting an input from the CPU 22 or the external centronics interface 23, a mode selection switch 25 by which a user switches between the facsimile mode and the printer mode, a mode display unit 26 for displaying the printer mode or the facsimile mode, and a counter 27 for measuring time left in the printer mode.

In the present embodiment, the CPU 22 sets the printer input selection switch 24 to the external interface 23 during the printer mode so that the external interface 23 is connected to the printer 21. The printer 21 receives a print signal from the host computer through the external interface 23, converts the received signal to an image, and sends it to the printer 21.

The CPU 22 monitors a busy port or a data strobe port of the external interface 23 to determine whether the printer 21 has received the print data from the external computer or not. The CPU 22 monitors the busy port at one-second intervals by interruption and increments the counter 27 every one second. The counter 27 is reset when the busy port is set or the mode selection key 25 is depressed.

During the facsimile mode, the printer input selection switch 24 is switched to the CPU 22 by the CPU 22 so that the external interface 23 is isolated from the printer 21.

Figure 7:
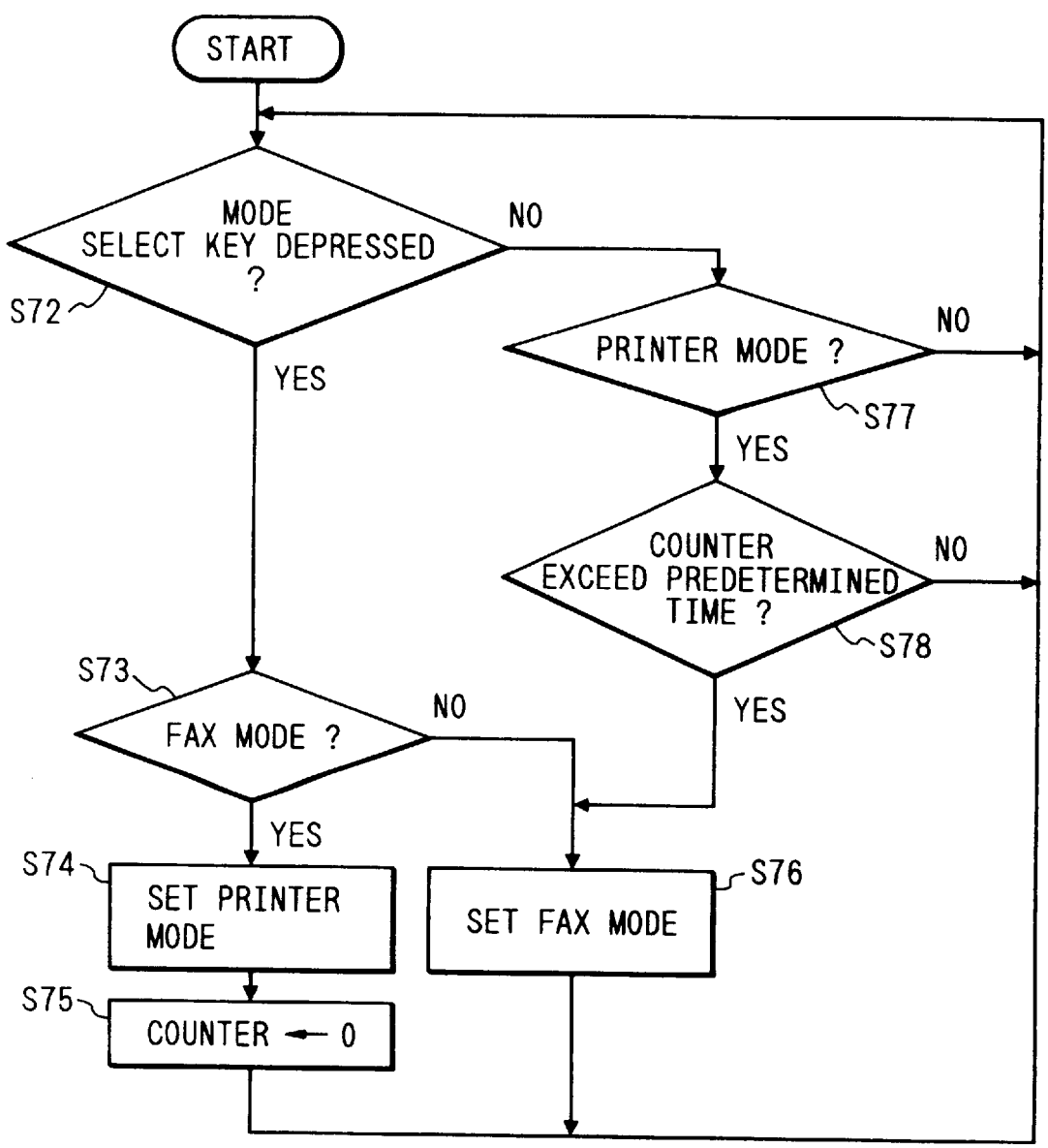
FIG. 7 shows a flow chart of a process in a stand-by mode in the fourth embodiment.

FIG. 7 shows a flow chart of the process in the stand-by mode of the CPU 22 in the fourth embodiment.

In S72, whether the mode selection switch 25 has been depressed or not is determined. If it has been depressed, the process proceeds to S73.

In S73, if the current mode is the facsimile mode, the printer mode is set-in S74 and the selection of the printer mode is displayed in the mode display unit 26. The counter 27 is reset in S75 and the process returns to S72.

If the current mode is the printer mode, the facsimile mode is set in S76 and the selection of the facsimile mode is displayed in the mode display unit 26. The process proceeds to S72.

In S72, if the mode selection switch 25 has not been depressed, the mode is checked in S77. If it is the printer mode, the counter 27 is referred in S78, and if the count of the counter 27 has exceeded a predetermined time, the facsimile mode is set in S76 and the selection of the facsimile mode is displayed in the mode display unit 26. Then, the process proceeds to S72.

If the mode is not the printer mode in S77, or if the count of the counter 27 does not exceed the predetermined time in S78, the process returns to S72.

In accordance with the present invention, since the means for determining the external factor to operate as the facsimile is provided, the apparatus may normally stand-by as the printer and it automatically switches the mode as required so that it functions as the facsimile only when it is needed. Thus, it is not necessary for the user to pay attention whether the apparatus is in the facsimile mode or the printer mode, and the operability is significantly improved.

In accordance with the present invention, a key for switching between the printer mode and the facsimile mode is not necessary, and the display of the selection of the printer mode or the facsimile mode is not necessary. Accordingly, freedom of design is enhanced and the cost is reduced.

In accordance with the present invention, even when the user manually sets the mode, whether the apparatus has been left in the printer mode or not is determined, and if it has been left, the mode is automatically switched to the facsimile mode. Thus, even if the user fails to switch back to the facsimile mode, the auto-reception is attained.

The present invention is not limited to the above embodiments but various modifications thereof may be made.

What is claimed is:

1. An image processing apparatus having a printer mode for printing, by means of a printer, data received from an external apparatus through an external interface and a facsimile mode for performing facsimile processing including reception of data through a line different from the external interface, said image processing apparatus comprising:

hook-state detection means for detecting a hook-state of the line so as to detect whether a hook is in an on-state or an off-state, wherein said hook-state detection means is capable of detecting the hook-state even when data communication through the line is not being performed;

calling signal detection means for detecting a calling signal from the line; and control means for providing such a control that as an operation mode for said image processing apparatus, the printer mode is set up during a standby period, and when said calling signal detecting means detects the calling signal in an auto-receive mode, the operation mode is automatically switched over from the printer mode to the facsimile mode to perform the facsimile processing and to inhibit printing in the printing mode, wherein said control means further provides such a control that when said hook-state detection means detects the off-hook state, the facsimile mode is set without a direct manual instruction for switching over the operation mode.

2. An image processing apparatus according to claim 1, further comprising document detection means for detecting the presence or the absence of a document on a reading portion, wherein when said document detection means detects the presence of the document, said control means sets the facsimile mode.

3. An image processing apparatus according to claim 2, wherein the facsimile processing performed in the facsimile mode includes copying of the document.

4. An image processing apparatus according to claim 1, further comprising start-key-state detection means for detecting an instruction to start performing the facsimile processing, the instruction being implemented by depression of a start-key, wherein when said hook-state detection means detects the off-state and said start-key detecting means detects the depression of the start-key, transmission or manual-receiving of data through the line is performed in the facsimile mode.

5. An image processing apparatus having a printer mode for printing, by means of a printer, data received from an external apparatus through an external interface, and a facsimile mode for performing facsimile processing including reception of data through a line different from the external interface, said image processing apparatus comprising:

storage means for storing data received through a printer port; and control means for switching an operation mode between the printer mode and the facsimile mode, wherein said control means provides control such that when a condition to switch the operation mode from the printer mode to the facsimile mode is detected, if the printer is printing in the printer mode, the printing is interrupted, regardless of how much of a page has already been printed, while the data of the page being printed and subsequent pages, which are to be printed in the printer mode, are retained in said storage means, and then the operation mode is switched over to the facsimile mode to perform the facsimile processing and to inhibit printing in the printer mode, and after completion of the processing in the facsimile mode, the operation mode is automatically returned to the printer mode, and printing is started anew by the printer for an interrupted page, at a head position, as stored in said storage means.

6. An image processing apparatus according to claim 5, wherein said control means provides, upon detecting the fact that a hook is in an on-state and also the fact that a calling signal is generated, such a control that the operation mode is automatically switched from the printer mode to the facsimile mode so that the facsimile processing including the reception of image data through the line is performed.

7. An image processing apparatus according to claim 5, wherein said control means provides, upon detecting the fact that a hook is in an off-state, the fact that a document is present on a reading section, and the fact that a start key is depressed, such a control that the operation mode is automatically switched from the printer mode to the facsimile mode so that image data read in said reading section are transmitted.

8. An image processing apparatus according to claim 5, wherein said control means provides, upon detecting the fact that a hook is in an on-state, detecting the fact that a document is present on a reading section, and the fact that a start key is depressed, such a control that the operation mode is automatically switched from the printer mode to the facsimile mode so that a copying for the document is effected.

9. A method of controlling an image processing apparatus having a printer mode for printing, by means of a printer, data received from an external apparatus through an external interface and a facsimile mode for performing a facsimile processing including reception of data through a line different from the external interface, the image processing method comprising the following steps:

detecting a hook-state of the line so as to detect whether a hook is in an on-state or an off-state, even when data communication through the line is being not performed;

detecting a calling signal from the line;

providing such a control that as an operation mode for the image processing apparatus, the printer mode is set up during a stand-by period, and when the calling signal detecting step detects the calling signal in an auto-receive mode, the operation mode is automatically switched over from the printer mode to the facsimile mode to perform the facsimile processing and to inhibit printing in the printer mode; and setting the facsimile mode, without a direct manual instruction for switching over the operation mode, when the off-state is detected.

10. A method of controlling an image processing apparatus having a printer mode for printing, by means of the printer, data received from an external apparatus through an external interface, and a facsimile mode performing a facsimile processing including reception of data through a line different from the external interface, the method comprising following steps:

storing data received through a printer port in a storage means; and detecting a condition to switch the operation mode from the printer mode to the facsimile mode;

if the printer is printing in the printer mode, interrupting the printing, regardless of how much of a page has already been printed;

retaining, in the storage means, the data of the page being printed and subsequent pages, which are to be printed in the printer mode, then switching an operation mode over to the facsimile mode to perform the facsimile processing and inhibiting printing in the printing mode;

after completion of the processing in the facsimile mode, automatically returning the operation mode to the printer mode; and starting printing anew, by the printer, for an interrupted page, at a head position, as stored in the storage means.

11. An image processing apparatus having a printer mode for printing, by means of a printer, data received from an external apparatus through an external interface, and a facsimile mode for performing facsimile processing including reception of data through a line different from the external interface, said image processing apparatus comprising:

hook-state detection means for detecting a hook-state of the line so as to detect whether a hook is in an on-state or an off-state, wherein said hook-state detection means is capable of detecting the hook-state even when data communication through the line is not being performed;

calling signal detection means for detecting a calling signal from the line; and control means for providing control such that as an operation mode for said image processing apparatus, the printer mode is set up during a stand-by period, and when said calling signal detection means detects the calling signal, the operation mode is automatically switched over from the printer mode to the facsimile mode in response to a detection by said calling signal detection means so as to perform the facsimile processing and to inhibit printing in the printer mode and after completion of processing in the facsimile mode, the operation mode is automatically returned to the printer mode, wherein said control means further provides control such that when said hook-state detection means detects the off-state condition, the facsimile mode is set without a direct manual instruction for switching over the operation mode.

12. An apparatus according to claim 11, wherein said control means provides such a control that the operation mode may be switched from the printer mode to the facsimile mode so as to perform the facsimile processing including reception of image data through the line, if the data is not being printed in the printer mode when said calling detection means detects the calling signal.

13. An image processing apparatus according to claim 11, further comprising document detection means for detecting the presence or the absence of a document on a reading portion, wherein when said document detection means detects the presence of the document, said control means sets the facsimile mode.

14. An image processing apparatus according to claim 13, wherein the facsimile processing performed in the facsimile mode includes copying of the document.

15. An image processing apparatus according to claim 11, further comprising start-key-state detection means for detecting an instruction to start performing the facsimile processing, the instruction being implemented by depression of a start-key, wherein when said hook-state detection means detects the off-state and said start-key detecting means detects the depression of the start-key, transmission or manual-receiving of data through the line is performed in the facsimile mode.

16. A method of controlling an image processing apparatus having a printer mode for printing, by means of a printer, data received from an external apparatus through an external interface, and a facsimile mode for performing a facsimile processing including reception of data through a line different from the external interface, said method comprising:

detecting a hook-state of the line so as to detect whether a hook is in an on-state or an off-state, even when data communication through the line is not being performed;

detecting a calling signal from the line;

providing such a control that as an operation mode for the image processing apparatus, the printer mode is set up during a stand-by period, and when the calling signal is detected in said detecting step, automatically switching the operation mode over from the printer mode to the facsimile mode in response to the detection in said detecting step so as to perform the facsimile processing and to inhibit printing in the printer mode, and after completion of processing in the facsimile mode, automatically returning the operation mode to the printer mode, and when the off-state is detected in said hook-state detecting step, setting the facsimile mode without a direct manual instruction for switching over the operation mode.

17. An image processing apparatus comprising:

first connection means for connecting to a line for communication of data through the line;

second connection means for connecting to an external apparatus for communication of data with the external apparatus;

a printer for printing an image representing the data received through said first and second connection means;

hook-state detection means for detecting a hook-state of the line so as to detect whether a hook is in an on-state or an off-state, wherein said hook-state detection means is capable of detecting the hook-state even when data communication through the line is not being performed; and setting means for setting a facsimile mode for performing facsimile processing including communication of data through said first connection means and a printer mode for printing an image based on data received through said second connection means using said printer, wherein when said hook-state detection means detects the off-state condition, said setting means sets the facsimile mode without a direct manual instruction for setting the facsimile mode.

18. An image processing apparatus according to claim 17, further comprising document detection means for detecting the presence or the absence of a document on a reading portion, wherein when said document detection means detects the presence of the document, said setting means sets the facsimile mode.

19. An image processing apparatus according to claim 18, wherein the facsimile processing performed in the facsimile mode includes copying of the document.

20. An image processing apparatus according to claim 17, further comprising start-key-state detection means for detecting an instruction to start performing the facsimile processing, the instruction being implemented by depression of a start-key, wherein when said hook-state detection means detects the off-state and said start-key detecting means detects the depression of the start-key, transmission or manual-receiving of data through said first connection means is performed in the facsimile mode.

* * * * *

UNITED STATES PATENT AND TRADEMARK OFFICE
CERTIFICATE OF CORRECTION

PATENT NO. : 5,877,869

DATED : March 2, 1999

INVENTOR(S) : SHUNICHI TACHIBANA

Page 1 of 2

It is certified that error appears in the above-identified patent and that said Letters Patent is hereby corrected as shown below:

AT [57] ABSTRACT

Line 6, "facsimie;" should read --facsimile;--.

COLUMN 1

Line 4, "division," should be deleted.
    Line 24, "forget" should read --forgets--.

COLUMN 3

Line 11, "then" should read --then the--.
    Line 28, "proceed" should read --proceeds--.

COLUMN 5

Line 48, "set-in" should read --set in--.

UNITED STATES PATENT AND TRADEMARK OFFICE
CERTIFICATE OF CORRECTION

PATENT NO. : 5,877,869

DATED : March 2, 1999

INVENTOR(S) : SHUNICHI TACHIBANA

It is certified that error appears in the above-identified patent and that said Letters Patent is hereby corrected as shown below:

COLUMN 8

Line 13, "comprising" should read --comprising the--.

Signed and Sealed this

Twenty-first Day of December, 1999

Attest:

Q. TODD DICKINSON

Attesting Officer

Acting Commissioner of Patents and Trademarks